United States Patent
Kim et al.

(10) Patent No.: US 9,217,574 B2
(45) Date of Patent: Dec. 22, 2015

(54) HOT WATER SUPPLY APPARATUS ASSOCIATED WITH HEAT PUMP

(75) Inventors: Byungsoon Kim, Changwon-si (KR); Jahyung Koo, Changwon-si (KR); Kyongmin Kwon, Changwon-si (KR)

(73) Assignee: LG ELECTRONICS INC., Seoul (KR)

( * ) Notice: Subject to any disclaimer, the term of this patent is extended or adjusted under 35 U.S.C. 154(b) by 1183 days.

(21) Appl. No.: 13/076,973

(22) Filed: Mar. 31, 2011

(65) Prior Publication Data

US 2011/0289950 A1 Dec. 1, 2011

(30) Foreign Application Priority Data

May 28, 2010 (KR) .................. 10-2010-0050321

(51) Int. Cl.

| | |
|---|---|
| F25B 13/00 | (2006.01) |
| F25B 27/00 | (2006.01) |
| F24D 17/02 | (2006.01) |
| F24D 11/02 | (2006.01) |
| F24D 19/10 | (2006.01) |
| F24F 5/00 | (2006.01) |
| F25B 30/02 | (2006.01) |

(52) U.S. Cl.
CPC ............ *F24D 17/02* (2013.01); *F24D 11/0214* (2013.01); *F24D 19/1072* (2013.01); *F24F 5/0096* (2013.01); *F25B 30/02* (2013.01); *F24D 2200/31* (2013.01); *Y02B 30/126* (2013.01); *Y02B 30/52* (2013.01)

(58) Field of Classification Search
CPC . F24D 11/0214; F24D 17/02; F24D 19/1072; F24D 2200/31; F24D 19/1039; F24D 2200/123; F24F 5/0096; F25B 30/02; F25B 2313/003; F25B 25/005; F25B 2313/004; Y02B 30/12; Y02B 30/126
USPC ........................................................... 62/160
See application file for complete search history.

(56) References Cited

U.S. PATENT DOCUMENTS

| | | | | |
|---|---|---|---|---|
| 3,799,181 | A * | 3/1974 | Maddren | 137/1 |
| 3,861,459 | A * | 1/1975 | Koop | 165/62 |
| 3,885,736 | A * | 5/1975 | Amagami et al. | 237/8 R |
| 3,896,992 | A * | 7/1975 | Borovina et al. | 237/19 |
| 5,240,179 | A * | 8/1993 | Drinkwater | 237/80 |
| 2005/0252226 | A1* | 11/2005 | Seefeldt | 62/238.7 |

(Continued)

FOREIGN PATENT DOCUMENTS

| | | |
|---|---|---|
| CN | 2708155 Y | 7/2005 |
| EP | 0 431 760 A2 | 6/1991 |

(Continued)

OTHER PUBLICATIONS

Chinese Office Action issued in CN Application No. 201110064675.9 dated Feb. 21, 2013.

(Continued)

*Primary Examiner* — M. Alexandra Elve
*Assistant Examiner* — Henry Crenshaw
(74) *Attorney, Agent, or Firm* — Ked & Associates, LLP

(57) ABSTRACT

A hot water supply apparatus associated with a heat pump is provided. In the hot water supply apparatus, refrigerant flowing through an evaporator and a compressor of a refrigerant cycle may perform a heat-exchange operation with water so that, a hot water supply operation may be substantially continuously performed without performing a defrosting operation.

7 Claims, 10 Drawing Sheets

(56) References Cited

U.S. PATENT DOCUMENTS

| | | | |
|---|---|---|---|
| 2007/0199335 A1* | 8/2007 | Innes | 62/151 |
| 2007/0204636 A1* | 9/2007 | Concha et al. | 62/156 |
| 2008/0002443 A1* | 1/2008 | Ueda et al. | 363/126 |
| 2008/0092568 A1* | 4/2008 | Ookoshi et al. | 62/151 |

FOREIGN PATENT DOCUMENTS

| | | |
|---|---|---|
| JP | 02-195130 | 8/1990 |
| JP | 2002-333208 | 11/2002 |
| JP | 2008-249248 | 10/2008 |
| JP | 2008-249248 * | 12/2008 |
| KR | 2003-0053984 | 7/2003 |
| KR | 10-0430238 | 5/2004 |
| KR | 10-2005-0093166 | 9/2005 |
| KR | 10-0882595 | 2/2009 |

OTHER PUBLICATIONS

International Search Report issued in PCT Application No. PCT/KR2010/006615 dated Jun. 29, 2011.

European Search Report issued in Application No. 11158501.4 dated Feb. 3, 2014.

* cited by examiner

HOT WATER SUPPLY APPARATUS ASSOCIATED WITH HEAT PUMP

CROSS-REFERENCE TO RELATED APPLICATION(S)

This application claims priority under 35 U.S.C. §119 to Korean Application No. 10-2010-0050321 filed on May 28, 2010, whose entire disclosure is hereby incorporated by reference.

BACKGROUND

1. Field

This relates to a hot water supply apparatus, and in particular, to a hot water supply apparatus associated with a heat pump.

2. Background

In general, a hot water supply apparatus uses a heating source to heat water and supply the heated water to a user. An apparatus using a heat pump to heat water and supply the heated water to a user may be referred to as a hot water supply apparatus associated with a heat pump. Such a hot water supply apparatus may include a water supply passage for supplying water, a water storage part for storing the water to be supplied, a heating source for heating the water, and a water discharge passage for supplying the heated water to a user.

BRIEF DESCRIPTION OF THE DRAWINGS

The embodiments will be described in detail with reference to the following drawings in which like reference numerals refer to like elements wherein.

DETAILED DESCRIPTION

Reference will now be made in detail to the embodiments of the present disclosure, examples of which are illustrated in the accompanying drawings.

In the following detailed description, reference is made to the accompanying drawings that form a part hereof, and in which is shown by way of illustration specific embodiments which may be practiced. These embodiments are described in sufficient detail to enable those skilled in the art, and it is understood that other embodiments may be utilized and that logical structural, mechanical, electrical, and chemical changes may be made without departing from the spirit or scope as embodied and broadly described herein. To avoid detail not necessary to enable those skilled in the art, the description may omit certain understood information. The following detailed description is, therefore, not to be taken in a limiting sense, and scope is defined by the appended claims.

A heat pump may include a compressor, a condenser in which compressed refrigerant discharged from the compressor is condensed, an expander in which refrigerant from the condenser is expanded, an evaporator in which refrigerant from the expander is evaporated, and a refrigerant pipe connecting the compressor, the condenser, the expander, and the evaporator to form a refrigerant cycle. As refrigerant flows through the heat pump, the refrigerant absorbs heat in the evaporator and emits heat in the condenser. It may be advantageous to transmit this heat to the water in the hot water supply device to heat the water, so that the hot water supply device can perform a hot water supply operation.

A water circulation system associated with a refrigerant cycle may include a first refrigerant circulation unit where a first refrigerant exchanges heat with outdoor air, a second refrigerant circulation unit where a second refrigerant exchanges heat with the first refrigerant, and a water circulation unit where water for at least one of indoor heating/cooling or hot water supplying flows. Such a water circulation system may be embodied in, for example, an outdoor unit as shown in FIG. 1.

Figure 1:
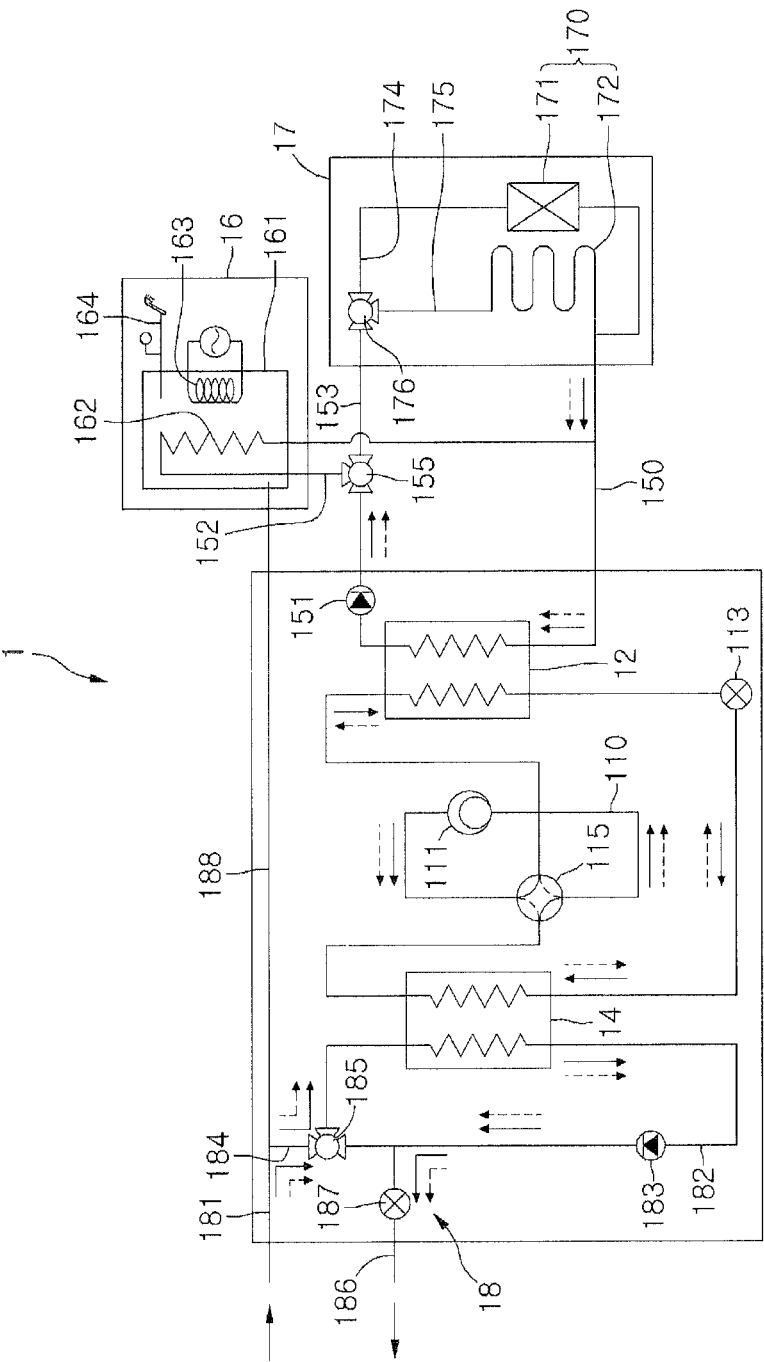
FIG. 1 is a schematic view of a hot water supply apparatus associated with a heat pump, according to an embodiment as broadly described herein.

Referring to FIG. 1, a hot water supply apparatus 1 associated with a heat pump may include a compressor 111 that compresses a refrigerant, a condenser that condenses refrigerant discharged from the compressor 111, an expander 113 that expands refrigerant discharged from the condenser, and an evaporator that evaporates refrigerant discharged from the expander 113. The hot water supply apparatus 1 may also include a usage side heat exchanger 12 that uses the refrigerant to perform a hot water supply operation and an indoor heating/cooling operation, and a heat source side heat exchanger 14 in which the refrigerant absorbs heat from and emits heat to a heat source, such as, for example water in a water supply device.

The usage heat exchanger 12 and the heat source heat exchanger 14 may function as condensers or evaporators based on particular operation conditions. In detail, in a heating operation, the usage heat exchanger 12 may be used as a condenser and the heat source heat exchanger 14 may be used as an evaporator, and, in a cooling operation, the usage heat exchanger 12 may be used as an evaporator, and the heat source heat exchanger 14 may be used as a condenser.

The hot water supply apparatus 1 may also include a flow switch 115 that switches a flow direction of the refrigerant discharged from the compressor 111 to one of the usage heat exchanger 12 or the heat source heat exchanger 14, and a refrigerant pipe 110 connecting the compressor 111, the flow switch 115, the usage heat exchanger 12, the expander 113, and the heat source heat exchanger 14 to form a refrigerant cycle.

Refrigerant flowing through the condenser and the evaporator may undergo heat exchange with water. That is, heat may be exchanged between refrigerant and water at both the heat source side heat exchanger 14 and the usage side heat exchanger 12, thus functioning as a water refrigerant heat exchanger exchanging heat between the refrigerant and water. As long as the heat exchangers 12 and 14 do not require defrosting, the hot water supply operation and the heating operation may be performed substantially continuously.

The hot water supply apparatus 1 may also include a water pipe 150 in which water that has undergone heat exchange with the refrigerant in the usage heat exchanger 12 flows, a usage side pump 151 that forcibly moves water in the water pipe 150, a hot water supply device 16 that supplies the water heated by the refrigerant in the usage side heat exchanger 12, and a heating/cooling device 17 that uses the water that has undergone heat exchange with the refrigerant in the usage side heat exchanger 12 to perform a heating/cooling operation.

In detail, the water pipe 150 is connected to the usage side heat exchanger 12 to move water that has undergone heat exchange with the refrigerant in the usage side heat exchanger 12. The water pipe 150 forms a closed loop circuit such that the heat-exchanged water returns to the usage side heat exchanger 12 through the hot water supply device 16 or the heating/cooling device 17. That is, water passing through the usage side heat exchanger 12 circulates to pass through the hot water supply device 16 or the heating/cooling device 17 along the water pipe 150. The usage side pump 151 is installed on a side of the water pipe 150 to forcibly move water in the water pipe 150.

The hot water supply device 16 heats and supplies water for various purposes, such as, for example, domestic uses or commercial uses. In detail, the hot water supply device 16 may include a hot water supply tank 161 storing externally supplied water and heating the stored water, a hot water supply heat exchanger 162 exchanging heat between water passing through the usage side heat exchanger 12 and water of the hot water supply tank 161, an auxiliary heater 163 disposed in the hot water supply tank 161, and a water discharge passage 164 supplying hot water from the hot water supply tank 161 to a user.

The hot water supply heat exchanger 162 may be configured in any shape provided that water of the hot water supply tank 161 may be heated by water flowing in the water pipe 150, for example, at least one portion of the water pipe 150 may be accommodated in the hot water supply tank 161.

The heating/cooling device 17 may include an indoor heat exchanger 170 that is adjacent to an indoor space to exchange heat between the second refrigerant and the indoor space. The indoor heat exchanger 170 may include an air-conditioning heat exchanger 171 in which heat is exchanged between indoor air and the second refrigerant, and a bottom surface heat exchanger 172 in which heat is exchanged between an a lower/bottom surface of the indoor space, such as, for example, the floor, and the second refrigerant.

The air-conditioning heat exchanger 171 may be a device such as, for example, a fan coil unit in which heat may be exchanged between water and indoor air. The floor heat exchanger 172 may be configured in any shape provided that heat may be exchanged between water and the floor, for example, at least one portion of the water pipe 150 may be installed in the floor.

The hot water supply device 16 may be connected to the heating/cooling device 17 in parallel on the water pipe 150. In more detail, the water pipe 150 may include a hot water supply pipe 152 that branches off from a discharge side of the usage side heat exchanger 12 and joins an introduction side of the hot water supply heat exchanger 162, and a heating/cooling water pipe 153. The hot water supply device 16 may be installed on the hot water supply pipe 152, and the heating/cooling device 17 may be installed on the heating/cooling water pipe 153. A point of the water pipe 150 from which the hot water supply pipe 152 and the heating/cooling water pipe 153 are branched may be provided with a usage side three-way valve 155 that switches a flow direction of water such that water passing through the usage side heat exchanger 12 is selectively introduced into one of the hot water supply device 16 or the heating/cooling device 17.

The air-conditioning heat exchanger 171 may be connected to the floor heat exchanger 172 in parallel on the water pipe 150. In more detail, the heating/cooling water pipe 153 may include an air-conditioning water pipe 174 and a floor water pipe 175, which are branched from each other, with the air-conditioning heat exchanger 171 installed on the air-conditioning water pipe 174, and the floor heat exchanger 172 installed in the floor water pipe 175. A point of the heating/cooling water pipe 153 where the air-conditioning water pipe 174 and the floor water pipe 175 are branched from each other may be provided with a heating/cooling side three-way valve 176 that switches a flow direction of water such that water introduced into the floor water pipe 175 is selectively introduced into one of the air-conditioning heat exchanger 171 or the floor heat exchanger 172.

The hot water supply apparatus 1 may also include a source water supply device 18 in which water to be heat-exchanged with the refrigerant in the heat source side heat exchanger 14 flows. The source water supply device 18 may include a water supply passage 181 connected to a water supply source, a circulation passage 182 in which water to be heat-exchanged with the refrigerant in the heat source side heat exchanger 14 circulates, a circulation side pump 183 for forcibly moving water in the circulation passage 182, a circulation side supply passage 184 supplying water to the circulation passage 182, a water supply adjustment device 185 that selectively prevents water supply through the circulation side supply passage 184, a circulation side discharge passage 186 that discharges water from the circulation passage 182, and a water discharge adjustment device 187 that selectively prevents a water discharge through the circulation side discharge passage 186. Since the heat source side heat exchanger 14 is simultaneously connected to the circulation passage 182 and the refrigerant pipe 110, heat may be exchanged in the heat source heat exchanger 14 between water flowing in the circulation passage 182 and refrigerant flowing in the refrigerant pipe 110.

The water supply passage 181 is connected to a water supply source capable of continually supplying water, such as, for example, a water-supply facility. The circulation side supply passage 184 connects the water supply passage 181 to the circulation passage 182 to supply water from the water supply source to the circulation passage 182. The water supply adjustment device 185 is installed on the circulation side supply passage 184 to selectively prevent water supply to the circulation passage 182. The circulation side discharge passage 186 is branched from a side of the circulation passage 182 to guide water flowing in the circulation passage 182 to the outside. The water discharge adjustment device 187 is installed on the circulation side discharge passage 186 to selectively prevent discharge of water from the circulation passage 182 to the outside. The circulation side pump 183 is installed on a side of the circulation passage 182 to forcibly circulate water in the circulation passage 182.

The hot water supply apparatus 1 may also include a hot water supply side supply passage 188 to supply water to the hot water supply device 16. The hot water supply side supply passage 188 connects the water supply passage 181 to the hot water supply device 16 to supply water from the water supply source to the hot water supply device 16. In more detail, the hot water supply side supply passage 188 connects the water supply passage 181 to the hot water supply tank 161 to guide water from the water supply source to the hot water supply tank 161 through the water supply passage 181 and the hot water supply side supply passage 188.

Since the circulation side supply passage 184 and the hot water supply side supply passage 188 are simultaneously connected to the water supply passage 181 and the water supply source, water may be simultaneously supplied from the water supply source to the circulation passage 182 and to the hot water supply device 16 through the circulation side supply passage 184 and the hot water supply side supply passage 188. That is, water flowing in the circulation passage 182 and water stored and heated in the hot water supply device 16 may be supplied from the same water supply source.

Hereinafter, flows of water and refrigerant in a hot water supply device associated with a heat pump, as embodied and broadly described herein, will be described in detail with reference to the accompanying drawings.

Referring to FIG. 1, when the hot water supply apparatus 1 is in a hot water supply or heating operation, the refrigerant discharged from the compressor 111 is introduced into the usage side heat exchanger 12. The refrigerant passing through the usage side heat exchanger 12 heats the usage side water and is condensed. The refrigerant discharged from the usage side heat exchanger 12 is expanded through the expander 113, and then, is introduced into the heat source side heat exchanger 14. The refrigerant introduced into the heat source side heat exchanger 14 absorbs heat from water in the heat source, and is evaporated. The refrigerant discharged from the heat source side heat exchanger 14 is introduced again to the compressor 111. At this point, the flow switch 115 provides for communication between the refrigerant pipe 110 at the discharge side of the compressor 111 and the refrigerant pipe 110 at the introduction side of the usage side heat exchanger 12, and maintains communication between the refrigerant pipe 110 at the discharge side of the heat source side heat exchanger 14 and the refrigerant pipe 110 at the introduction side of the compressor 111.

Water discharged from the usage side pump 151 may be introduced into the hot water supply device 16 or the heating/cooling device 17. In particular, the usage side three-way valve 155 may introduce water into the hot water supply device 16 in the hot water supply operation, and into the heating/cooling part 17 in the heating operation.

Water introduced into the hot water supply device 16 flows in the hot water supply heat exchanger 162 along the water pipe 150 at the hot water supply side and heats water stored in the hot water supply tank 161, and then, is discharged from the hot water supply device 16. The water discharged from the hot water supply device 16 passes through the usage side heat exchanger 12 along the water pipe 150 at the usage side and is heated to a high temperature by the refrigerant, and then, is introduced again into the usage side pump 151 so as to continuously circulate.

The water introduced into the heating/cooling device 17 is introduced along the heating/cooling water pipe 153 to the indoor heat exchanger 170. In more detail, the water introduced into the heating/cooling device 17 may be selectively introduced into one of the air-conditioning heat exchanger 171 or the floor heat exchanger 172 by the heating/cooling side three-way valve 176. The water introduced into the air-conditioning heat exchanger 171 heats indoor air, and the water introduced into the floor heat exchanger 172 heats the floor. The water passing through one of the air-conditioning heat exchanger 171 or the floor heat exchanger 172 is introduced into the usage side heat exchanger 12 along the water pipe 150 at the usage side. The water passing through the usage side heat exchanger 12 is heated by the refrigerant, and then, is introduced again into the usage side pump 151 so as to continuously circulate.

Water from the water supply source is introduced through the water supply passage 181 and the circulation side supply passage 184 into the circulation passage 182. At this point, the water supply adjustment device 185 maintains communication between the circulation side supply passage 184 and the circulation passage 182. The water introduced into the circulation passage 182 passes through the heat source side heat exchanger 12 and heats the refrigerant, and then, is discharged through the circulation side pump 183 and the circulation side discharge passage 186 to the outside.

In certain embodiments, water at the heat source side may be forcibly circulated by the circulation side pump 183. However, in alternative embodiments, when the water supply source, such as an external water supply facility, supplies water at its own pressure, the pressure of the water supplied by the external supply source may move the water in the circulation passage 182, without the circulation side pump 183.

A freezing and bursting prevention operation and a water saving operation may be performed during a heating or cooling operation to be described later. When at least one of the freezing and bursting prevention operation and/or the water saving operation is performed, water may flow in the circulation passage 182 along the circulation passage 162 such that water supply and water discharge from the circulation passage 182 is prevented. In this case, the circulation side pump 183 is used to control flow as appropriate.

When the hot water supply apparatus 1 is in the cooling operation, a flow direction of the refrigerant may be changed. In more detail, the refrigerant discharged from the compressor 111 may move sequentially through the heat source side heat exchanger 14, the expander 113, and the usage side heat exchanger 12, and then back into the compressor 111. The water flow at the heat source side may be the same as that in the heating operation, and the water at the usage side circulates through the heating/cooling device 17 and the usage side heat exchanger 12.

The hot water supply apparatus 1 may improve installation characteristics since refrigerant passing through the condenser and the evaporator of the refrigerant cycle are heat-exchanged with water. In more detail, both the condenser and the evaporator may be water-refrigerant heat exchangers in which heat is exchanged between water and refrigerant. In general, since a heat exchange density between water and refrigerant is higher than a heat exchange density between air and refrigerant, the volume of a water-refrigerant heat exchanger may be less than the volume of an air-refrigerant heat exchanger providing the same heat exchange capacity. Therefore, the water-refrigerant heat exchanger may consume a relatively small installation space, and thus may be installed in a relatively small space, thus minimizing the installation space occupied by such a hot water supply apparatus 1.

In addition, such a water-refrigerant heat exchanger may be installed in indoor and/or outdoor spaces. Thus, the usage side heat exchanger 12 and the heat source side heat exchanger 101, which function as the condenser and the evaporator, may be installed in a variety of spaces as appropriate for a particular location. Further, such a hot water supply apparatus 1 may be less subject to degradation due to variation in outdoor conditions, since water has a higher specific heat than air, and may be thus less affected by outdoor temperature. Thus, heat source side water, that is, circulation water, may be affected less by temperature variation than outside air, and degradation due to variation in outdoor conditions such as outdoor temperature may be minimized.

Still further, in both the condenser and the evaporator, heat is exchanged between water and refrigerant, and thus frost may be prevented from forming on the surfaces of the usage side heat exchanger 12 and the heat source side heat exchanger 14. Thus, a defrosting operation may be unnecessary, and the hot water supply operation and the heating operation may be continuously performed. Additionally, since a fan for forcibly moving outdoor air may be eliminated, noise may be reduced during an operation.

Hereinafter, a freezing and bursting prevention operation and a water saving operation of a hot water supply device associated with a heat pump as embodied and broadly described herein will be described with reference to the accompanying drawings.

Figure 2:
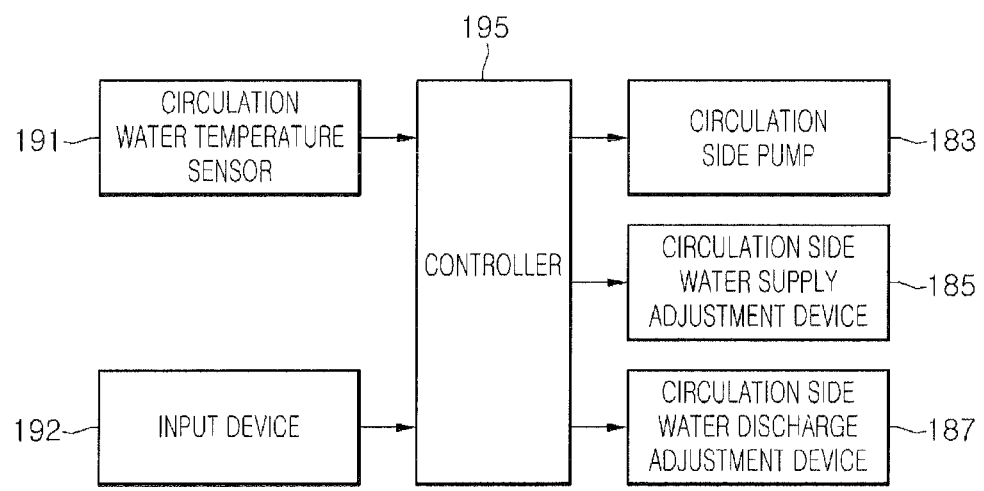
FIG. 2 is a block diagram of a hot water supply apparatus associated with a heat pump, according to an embodiment as broadly described herein.
Figure 3:
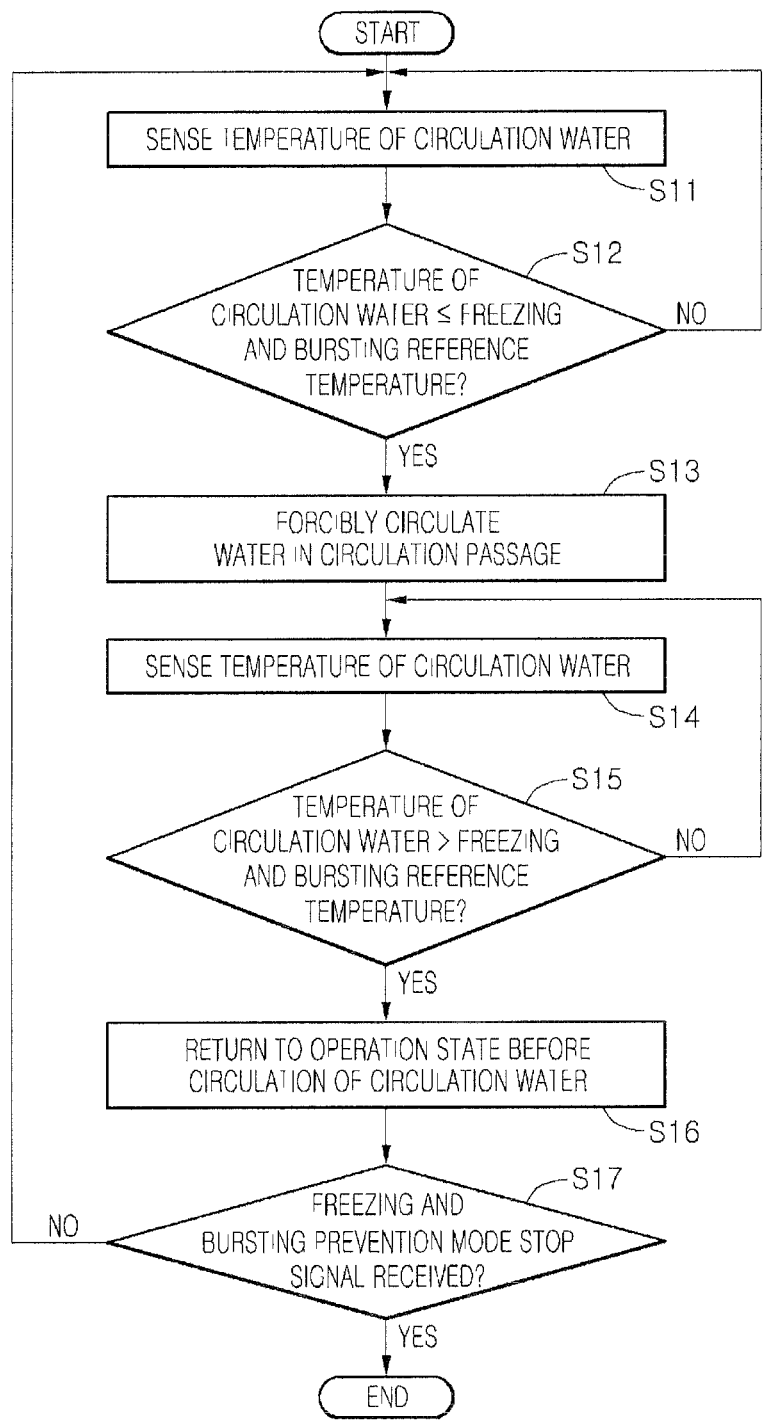
FIG. 3 is a flowchart of operation of a hot water supply apparatus associated with a heat pump in a freezing and bursting prevention operation, according to an embodiment as broadly described herein.
Figure 4:
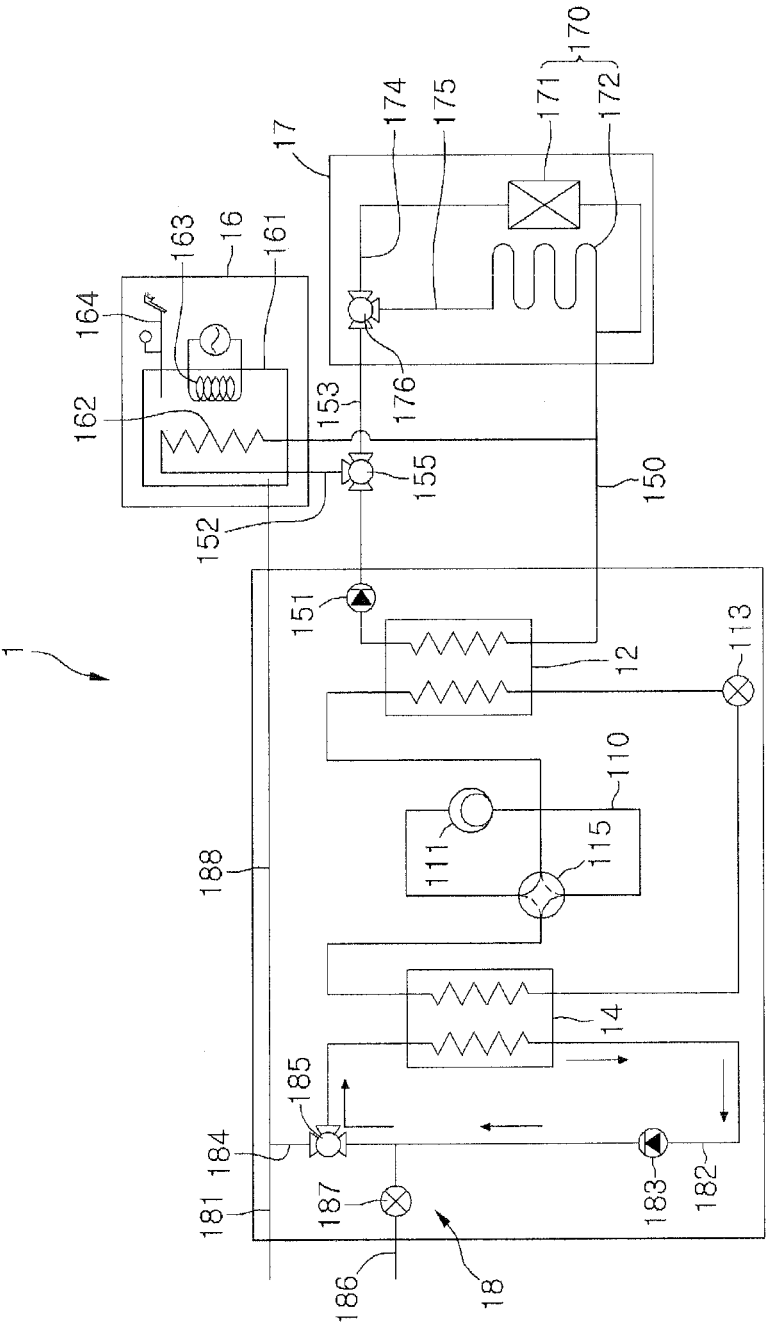
FIG. 4 is a schematic view of a circulation of heat source side water in a hot water supply apparatus associated with a heat pump, according to an embodiment as broadly described herein.
Figure 5:
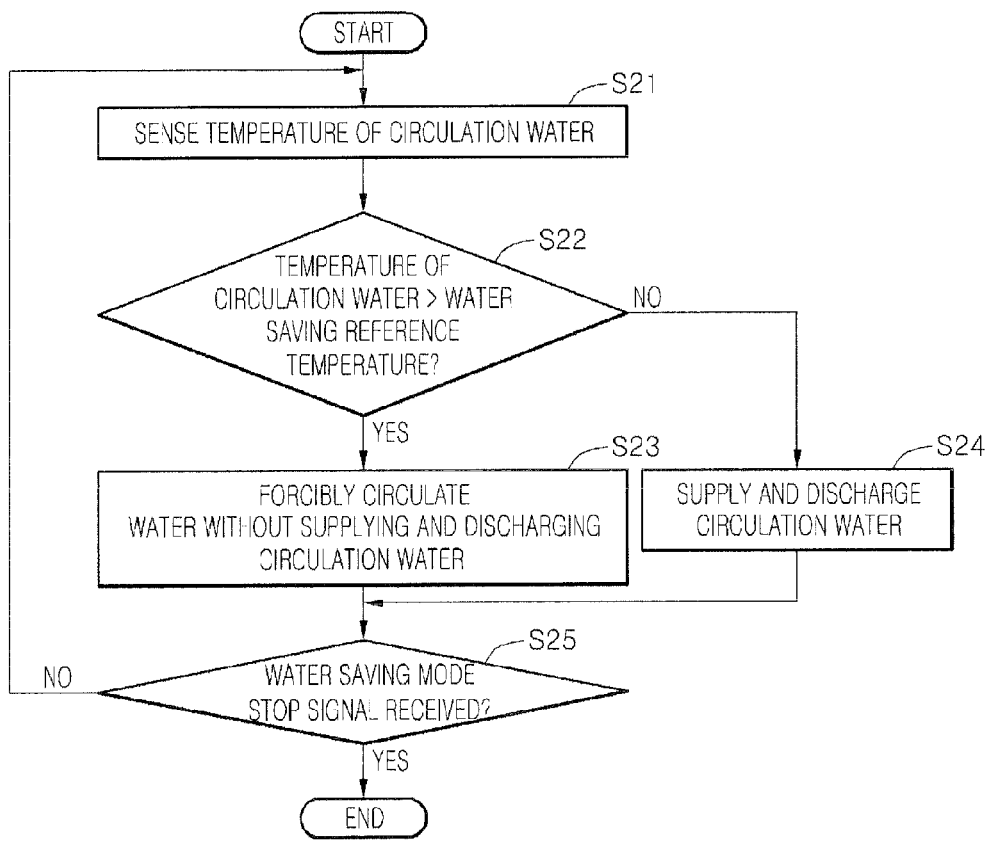
FIG. 5 is a flowchart of operation of a hot water supply apparatus associated with a heat pump in a water saving operation, according to an embodiment as broadly described herein.

FIG. 2 is a block diagram of a hot water supply apparatus associated with a heat pump, according to an embodiment as broadly described herein, and FIG. 3 is a flowchart of operation of a hot water supply apparatus associated with a heat pump in a freezing and bursting prevention operation, according to an embodiment as broadly described herein. FIG. 4 is a schematic view of a circulation of heat source side water in a hot water supply apparatus associated with a heat pump, according to an embodiment as broadly described herein, and FIG. 5 is a flowchart of operation of a hot water supply apparatus associated with a heat pump in a water saving operation, according to an embodiment as broadly described herein.

Referring to FIG. 2, the hot water supply apparatus 1 may also include a circulation water temperature sensor 191 for sensing the temperature of heat source side water, that is, the temperature of circulation water, an input device 192 for inputting/receiving various signals for an operation control, and a controller 195 controlling the operation of the circulation side pump 183, the operation of the water supply adjustment device 185 at the circulation side, and the operation of the water discharge adjustment device 187 at the circulation side according to a temperature sensed by the circulation water temperature sensor 191 or a signal input/received at the input device 192. The circulation water temperature sensor 191, the input device 192, the controller 195, the circulation side pump 183, the water supply adjustment device 185, and the water discharge adjustment device 187 may electrically connected to one another to transmit and receive control signals as appropriate.

The circulation water temperature sensor 191 may be installed at a side of the circulation passage 182 to sense the temperature of water flowing in the circulation passage 182. The input device 192 may be provided, for example, at the heating/cooling device 17, at the hot water supply device 16, on a remote control device, or other location as appropriate such that a user may easily input a command/signal.

Referring to FIG. 3, when the hot water supply apparatus 1 is in the freezing and bursting prevention operation, the temperature of the circulation water is sensed S11, for example, by the circulation water temperature sensor 191.

If the temperature of the circulation water is greater than a freezing and bursting reference temperature (S12), the temperature of the circulation water is repeatedly sensed (S11) and compared with the freezing and bursting reference temperature (S12).

However, if the temperature of the circulation water is less than or equal to the freezing and bursting reference temperature (S12), the circulation water is forcibly moved to circulate water through the circulation passage 182 (S13). The circulation water may be forcibly moved by, for example, the circulation side pump 183. The freezing and bursting reference temperature may denote a threshold temperature at which circulation water may be frozen. For example, the freezing and bursting reference temperature may be approximately 0° C.

Referring to FIG. 4, when circulating the circulation water through the circulation passage 182, water discharged from the circulation side pump 183 flows along the circulation passage 182 and is introduced into the usage side heat exchanger 12. The circulation water passing through the usage side heat exchanger 12 heats the refrigerant, and is introduced back into the circulation side pump 183 so as to continuously circulate along the circulation passage 182.

The water discharge adjustment device 187 closes the circulation side discharge passage 186 to prevent water discharge from the circulation passage 182, and the water supply adjustment device 185 closes the circulation side supply passage 184 to prevent water supply to the circulation passage 182, allowing circulation water to circulate in a closed loop along the circulation passage 182. Thus, even when the temperature of the circulation water is less than or equal to the freezing and bursting reference temperature, freezing of the circulation water may be minimized and delayed.

Referring again to FIG. 3, the temperature of the circulation water is sensed again (S14), and, if the temperature of the circulation water is less than or equal to the freezing and bursting reference temperature (S15), the process in which the temperature of the circulation water is repeatedly sensed (S14) and compared with the freezing and bursting reference temperature (S15).

However, if the temperature of the circulation water is greater than the freezing and bursting reference temperature (S15), the hot water supply apparatus 1 returns to a state before the forcible circulation of water (S16). For example, if the hot water supply apparatus 1 was stopped before the forcible circulation of water to prevent freezing and bursting S13, when the temperature of the circulation water after the circulation of water is greater than the freezing and bursting reference temperature (S15), the hot water supply apparatus 1 is stopped again (S16).

After returning to the previous operation state (S16), the temperature of the circulation water is sensed again (S11) until a signal for stopping the freezing and bursting prevention operation is input/received (S17).

Referring to FIG. 5, when the hot water supply apparatus 1 is in the water saving operation, first, the temperature of the circulation water is sensed (S21).

If the temperature of the circulation water is greater than a water saving reference temperature (S22), the circulation water circulates through the circulation passage 182 while a supply and a discharge of the circulation water is prevented (S23).

The water saving reference temperature may denote the minimum temperature value of the circulation water within a range where a heating performance and a hot water supply performance may be satisfied. For example, when the hot water supply apparatus 1 is in the heating and hot water supply operations, the circulation water heats the refrigerant through the usage side heat exchanger 12, and thus, the temperature of the circulation water continually decreases. This causes a temperature difference between the refrigerant and the circulation water passing through the usage side heat exchanger 12 to be gradually reduced, thus gradually degrading the heating performance and the hot water supply performance. In this case, a minimum comfortable heating performance and a minimum comfortable hot water supply performance may be determined, and a corresponding minimum temperature of the circulation water may be determined such that a heating performance and a hot water supply performance may be maintained at a level that is greater than or equal to the minimum comfortable heating performance and the minimum comfortable hot water supply performance. That is, when the temperature of the circulation water is greater than the water saving reference temperature, heating performance and hot water supply performance may be maintained within a comfortable range.

However, if the temperature of the circulation water is less than or equal to the water saving reference temperature (S22), the circulation water is supplied and discharged (S24). That is, since the water supply adjustment device 185 and the water discharge adjustment device 187 open the circulation side supply passage 184 and the circulation side discharge passage 186, water from the water supply source is supplied to the circulation passage 182, and simultaneously, the circulation water is discharged from the circulation passage 182 to the outside.

At this point, the circulation water circulating through the circulation passage 182 is discharged, and new circulation water can circulate through the circulation passage 182. The temperature of the new circulation water introduced into the circulation passage 182 is greater than the temperature of the water that has been discharged. Thus, the temperature of the circulation water may be maintained at greater than the water saving reference temperature. That is, heating performance and hot water supply performance may be maintained within a comfortable range.

Finally, if a signal for stopping the water saving operation is not received S25, the temperature of the circulation water is sensed again (S21).

The water saving operation may save water flowing in the circulation passage 182. In more detail, if the temperature of the circulation water is greater than the water saving reference temperature, the circulation water circulates through the circulation passage 182 without supply and discharge of the circulation water, so that an amount of consumed circulation water per unit time may be reduced. If the temperature of the circulation water is less than or equal to the water saving reference temperature, the circulation water is supplied and discharged, so that the temperature of the circulation water circulating through the circulation passage 182 may be maintained greater than the water saving reference temperature. Thus, the amount of water flowing through the circulation passage 182 may be minimized, and simultaneously, the heating performance and the hot water supply performance may be maintained.

When the hot water supply apparatus 1 is in the cooling operation, if the temperature of the circulation water does not reach a reference temperature, the circulation water is circulated through the circulation passage 182, and thus, water may be saved, and simultaneously, cooling performance may be maintained. The reference temperature may denote the maximum temperature value of the circulation water within a range where a required level of cooling performance may be satisfied.

The freezing and bursting prevention operation may be performed when the hot water supply apparatus 1 is stopped. The water saving operation may be performed simultaneously with the hot water supply operation, the heating operation, or the cooling operation.

A hot water supply apparatus 2 associated with a heat pump in accordance with another embodiment will be described in detail with reference to the accompanying drawings. This embodiment is different from the embodiment shown in FIG. 4 in that refrigerant may be excessively cooled using an excessive cooler, or a subcooler. In such a subcooler, fluid may be subcooled, or compressed, to a temperature that is lower than a freezing temperature thereof for a given pressure, below its freezing point, without solidifying. Such a subcooler may be employed to improve energy efficiency of a system in which it is installed.

Figure 6:
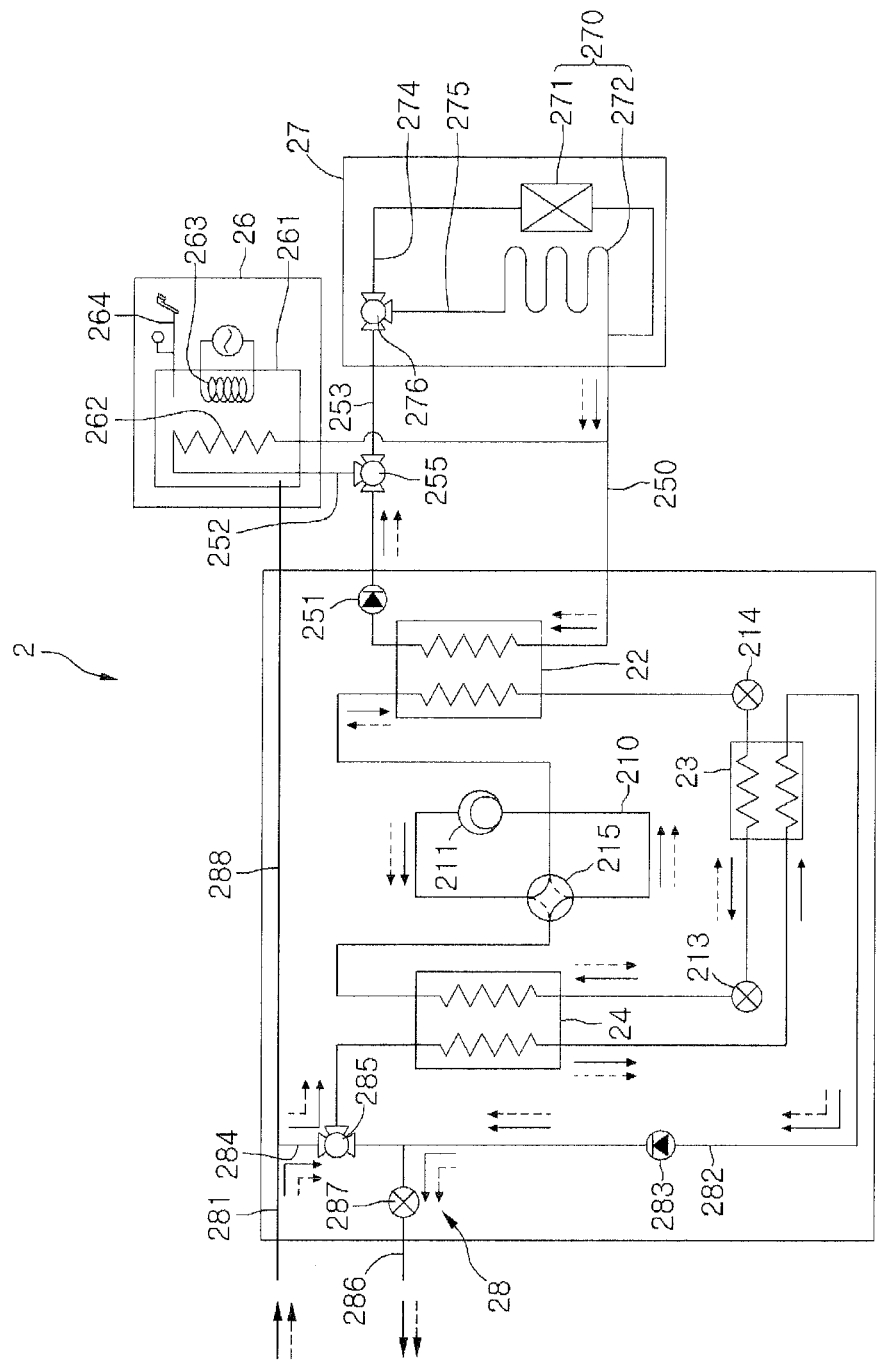
FIG. 6 is a schematic view of a hot water supply apparatus associated with a heat pump, according to another embodiment as broadly described herein.

As shown in FIG. 6, a subcooler 23 may be installed between a usage side heat exchanger 22 and an expander 213 of a refrigerant cycle. The subcooler 23 may be installed at a point corresponding to a discharge side of a heat source side heat exchanger 24 on a circulation passage 282. The subcooler 23 may be configured as a water-refrigerant heat exchanger that accommodates a water passage and a refrigerant passage adjacent to each other so as to exchange heat between water and refrigerant. Thus, when the hot water supply apparatus 2 is in a heating operation, the refrigerant that heats usage side water through the usage side heat exchanger 22 may heat the heat source side water using circulation water flowing through the subcooler 23.

Water, which heats refrigerant through the heat source side heat exchanger 24 and is cooled, may be heated by absorbing heat from refrigerant through the subcooler 23. Thus, when the hot water supply apparatus 2 is in a water saving operation, a rate at which the temperature of the circulation water decreases may be decreased. That is, since circulation time of the circulation water may further increase in the water saving operation, the amount of saved water may further increase as a whole, and a water saving effect may be further improved.

The expander 213 may be a cooling expander 213 installed between the subcooler 23 and the usage side heat exchanger 22 so that, when the hot water supply apparatus 2 is in a cooling operation, the expander 213 is completely opened, and the refrigerant passes through the subcooler 23 and is expanded in the cooling expander 213, and thus, the refrigerant condensed through the heat source side heat exchanger 24 emits heat to the heat source side water in the subcooler 23 and may be excessively cooled.

The hot water supply apparatus 2 associated with the heat pump in accordance with the embodiment shown in FIG. 6 may also include a refrigerant pipe 210, compressor 211, flow adjustment switch 215, water pipe 250, usage side pump 251, hot water supply pipe 252, heating/cooling water pipe 253, usage side three way valve 255, a hot water supply device 26 including a storage tank 261, hot water supply heat exchanger 262, auxiliary heater 263 and water discharge passage 264, a heating/cooling device 27 including an indoor heat exchanger 270 having an air conditioning heat exchanger 271 and a floor heat exchanger 272, an air conditioning water pipe 274 and a floor water pipe 275 and a heating/cooling side three way valve 276, and a source water supply apparatus 28 including a water supply passage 281, circulation side pump 283, circulation side supply passage 284, water supply adjustment device 285, circulation side discharge passage 286, water discharge adjustment device 287 and hot water supply side supply passage 288. These components are similar to corresponding components discussed above with respect to previous embodiment(s), and thus further detailed description will be omitted.

A hot water supply apparatus 3 associated with a heat pump will be described in detail with reference to FIG. 7. This embodiment is different from the embodiment shown in FIGS. 1 and 4 in that an air-conditioning heat exchanger is connected to a refrigerant pipe.

Figure 7:
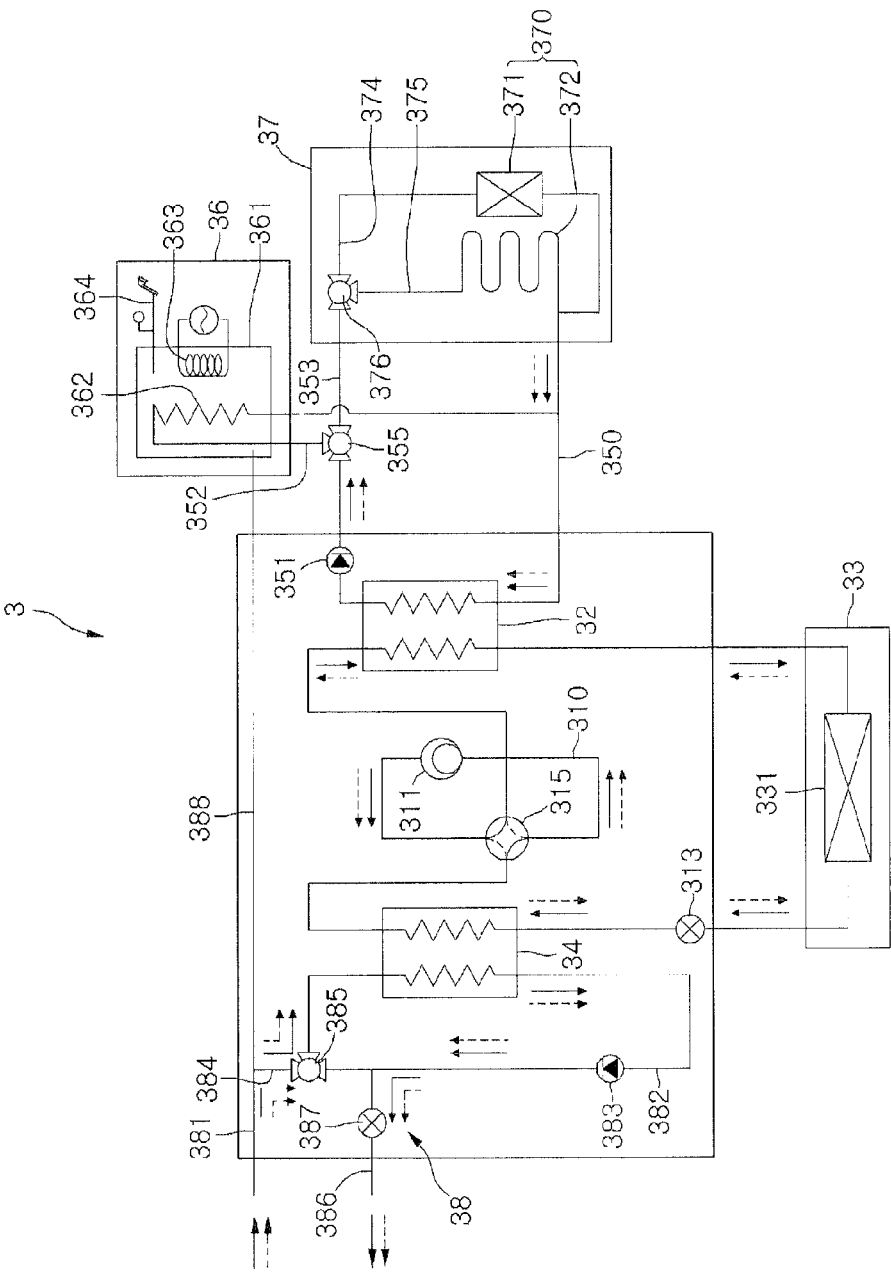
FIG. 7 is a schematic view of a hot water supply apparatus associated with a heat pump, according to another embodiment as broadly described herein.

Referring to FIG. 7, an air-conditioning heat exchanger 331 may be connected to a refrigerant pipe 310. Refrigerant flowing through the air-conditioning heat exchanger 331 may heat or cool indoor air to perform a heating or cooling operation.

In more detail, the air-conditioning heat exchanger 331 may be installed between a usage side heat exchanger 32 and an expander 313 of a refrigerant cycle. Thus, when the hot water supply apparatus 3 is in the heating operation, the refrigerant discharged from the usage side heat exchanger 32 heats indoor air through the air-conditioning heat exchanger 331 to heat an indoor space. When the hot water supply apparatus 3 is in the cooling operation, the refrigerant passing through a heat source side heat exchanger 34 is expanded through expander 313, and cools indoor air through the air-conditioning heat exchanger 331 to cool the indoor space. In certain embodiments, the air-conditioning heat exchanger 331 may be accommodated in an indoor device 33 disposed in an indoor space so as to be exposed to indoor air.

In the embodiment shown in FIG. 7, a heating performance and a cooling performance may be improved. In more detail, indoor air may be directly heated or cooled by the refrigerant, and thus, an amount of heat transfer between the refrigerant and the indoor air may be increased when compared to a method in which indoor air is heated or cooled using water heated or cooled by refrigerant. Thus, heating and cooling performance may be improved.

The hot water supply apparatus 3 associated with the heat pump in accordance with the embodiment shown in FIG. 7 may also include a compressor 311, flow adjustment switch 315, water pipe 350, usage side pump 351, hot water supply pipe 352, heating/cooling water pipe 353, usage side three way valve 355, a hot water supply device 36 including a storage tank 361, hot water supply heat exchanger 362, auxiliary heater 363 and water discharge passage 364, a heating/cooling device 37 including an indoor heat exchanger 370 having an air conditioning heat exchanger 371 and a floor heat exchanger 372, an air conditioning water pipe 374 and a floor water pipe 375 and a heating/cooling side three way valve 376, and a source water supply apparatus 38 including a water supply passage 381, circulation passage 382, circulation side pump 383, circulation side supply passage 384, water supply adjustment device 385, circulation side discharge passage 386, water discharge adjustment device 387 and hot water supply side supply passage 388. These components are similar to corresponding components discussed above with respect to previous embodiment(s), and thus further detailed description will be omitted.

A hot water supply apparatus 4 associated with a heat pump will be described in detail with reference to FIG. 8. This embodiment is different from the embodiment shown in FIGS. 1 and 4 in that a hot water supply device and a bottom surface, or floor, heating/cooling device using a desuperheater may be provided. Such a desuperheater may function as a waste heat recovery device that recovers superheat from compressor discharge gas to supplement a heating or a hot water supply operation.

Figure 8:
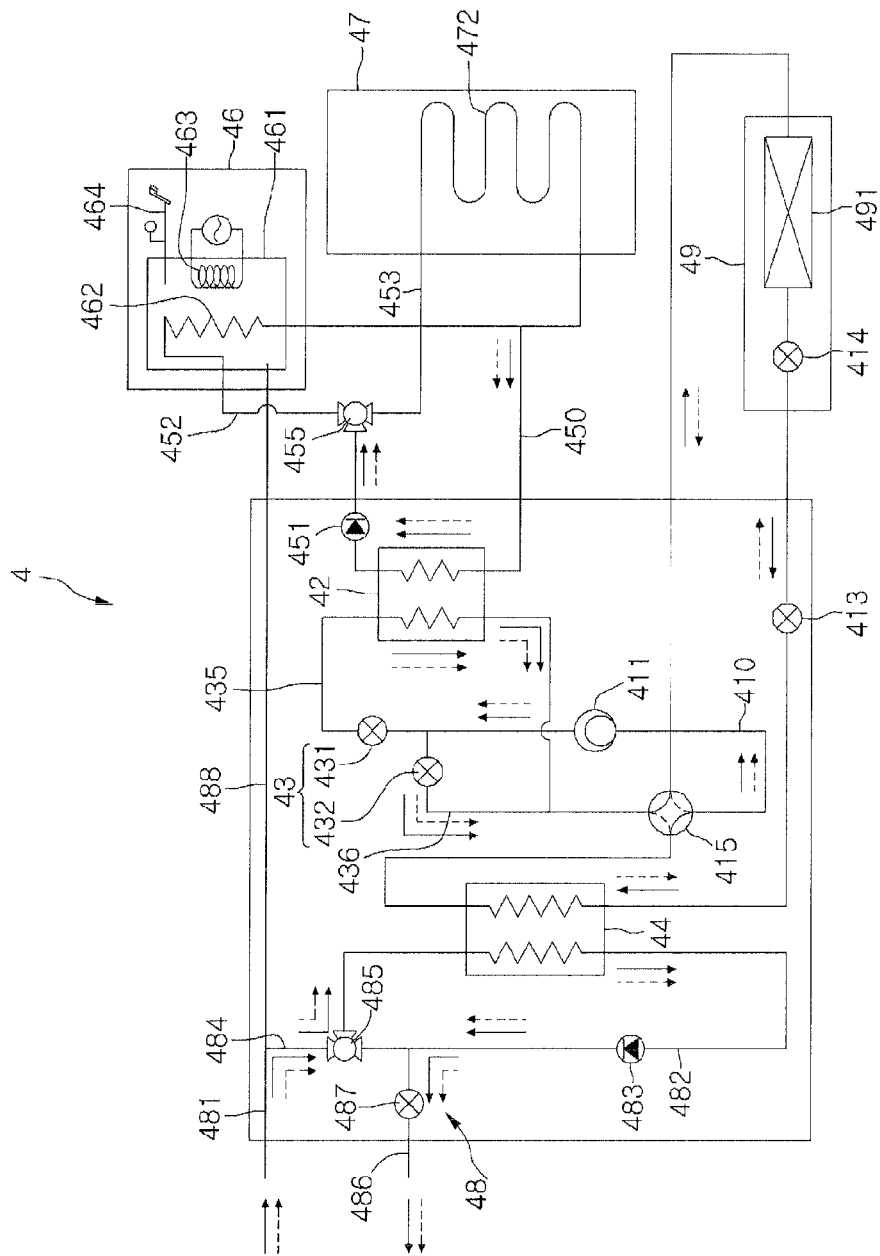
FIG. 8 is a schematic view of a hot water supply apparatus associated with a heat pump, according to another embodiment as broadly described herein.

Referring to FIG. 8, a hot water supply device 46 and a floor heating/cooling device 47 are provided using a desuperheater method. Thus, a usage heat exchanger 42 may function as a primary condenser in which the refrigerant at a discharge side of a compressor is primarily condensed, and one of an air-conditioning heat exchanger 491 or a heat source side heat exchanger may function as a secondary condenser in which the refrigerant at the discharge side of the compressor is secondarily used.

In the embodiment shown in FIG. 8, a main refrigerant pipe 410 may connect a compressor 411, an air-conditioning heat exchanger 491 provided in an indoor device 49 together with an expander 414, another expander 413, and a heat source side heat exchanger 44 to form a refrigerant cycle. A usage side refrigerant pipe 435 may guide refrigerant discharged from the compressor 411 to a usage side heat exchanger 42, and a bypass refrigerant pipe 436 may guide the refrigerant discharged from the compressor 411 to bypass the usage side heat exchanger 42.

In this embodiment, a flow rate adjustment device 43 may adjust an amount of refrigerant discharged from the compressor 411 and introduced into the usage side heat exchanger 42, and the amount of refrigerant introduced into the air-conditioning heat exchanger 491. The flow rate adjustment device 43 may include usage side flow rate adjustment device 431 that adjusts the amount of refrigerant introduced from the compressor 411 into the usage side heat exchanger 42, and a bypass flow rate adjustment device 432 that adjusts the amount of refrigerant introduced from the compressor 411 and bypassing the usage side heat exchanger 42. The usage side flow rate adjustment device 431 may be installed at a side of the usage side refrigerant pipe 435, and the bypass flow rate adjustment device 432 may be installed at a side of the bypass refrigerant pipe 436.

The usage side heat exchanger 42 may be installed between the compressor 411 and the flow switch 415 of the refrigerant cycle such that the usage side heat exchanger 42 functions as a primary condenser regardless of switching between heating and cooling. Thus, since the discharge side refrigerant of the compressor 411 having the maximum temperature on the refrigerant cycle is introduced directly into the usage side heat exchanger 42, hot water supply performance may be further improved.

In more detail, the refrigerant discharged from the compressor 411 may be introduced directly into the usage side heat exchanger 42. In this case, the usage side flow rate adjustment device 431 may be at least partially opened. The refrigerant primarily condensed by passing through the usage side heat exchanger 42 and heating the usage side water may be introduced into the air-conditioning heat exchanger 491 or the heat source side heat exchanger 44. The refrigerant passing through the usage side heat exchanger 42 may be introduced into the air-conditioning heat exchanger 491 in the heating operation, and the refrigerant passing through the usage side heat exchanger 42 may be introduced into the heat source side heat exchanger 44 in the cooling operation. Thus, the refrigerant primarily condensed in the usage side heat exchanger 42 may be secondarily condensed in the air-conditioning heat exchanger 491 in the heating operation, and the refrigerant primarily condensed in the usage side heat exchanger 42 may be secondarily condensed in the heat source side heat exchanger 44 in the cooling operation. That is, the usage side heat exchanger 42 may function as a primary condenser and the air-conditioning heat exchanger 491 may function as a secondary condenser in the heating operation, and the usage side heat exchanger 42 may function as a primary condenser and the heat source side heat exchanger 44 may function as a secondary condenser in the cooling operation. Regardless of switching between heating and cooling, since the discharge side refrigerant of the compressor 411 having the maximum temperature on the refrigerant cycle is introduced directly into the usage side heat exchanger 42, hot water supply performance may be further improved.

In certain embodiments, the floor heat exchanger 472 and the air-conditioning heat exchanger 491 may be installed separately. For example, the floor heat exchanger 472 may be connected to the usage side heat exchanger 42 such that the usage side water flows through the usage side heat exchanger 42, and the air-conditioning heat exchanger 491 may be connected to the main refrigerant pipe 410 so as to use the refrigerant discharged from the compressor 411 to heat or cool the indoor air.

The amount of refrigerant introduced into a hot water supply heat exchanger 462 and the amount of refrigerant bypassing the hot water supply heat exchanger 462 may be adjusted according to a hot water supply load and a heating/cooling load. For example, when the hot water supply load is greater than the heating/cooling load, the amount of refrigerant introduced into the usage side heat exchanger 42 may be increased, and the amount of refrigerant bypassing the usage side heat exchanger 42 may be decreased. Similarly, when the heating/cooling load is greater than the hot water supply load, the amount of refrigerant introduced into the usage side heat exchanger 42 may be decreased, and the amount of refrigerant bypassing the usage side heat exchanger 42 may be increased.

The hot water supply load may be a difference between a water discharge temperature of the hot water supply device 46 and a target temperature thereof, and the heating/cooling load may be a difference between the temperature of an indoor space, which is a heating/cooling target of the air-conditioning heat exchanger 491, and a target temperature of the indoor space.

In this embodiment, regardless of heating or cooling of the indoor space, the hot water supply operation may be continuously performed. The usage side heat exchanger 42 may be installed between the compressor 411 and the flow switch 415 of the refrigerant cycle. Thus, when the hot water supply apparatus 4 is in the heating operation, the refrigerant discharged from the compressor 411 simultaneously passes through the usage side heat exchanger 42 and the air-conditioning heat exchanger 491, so as to simultaneously perform the hot water supply operation and the indoor heating operation. In addition, when the hot water supply apparatus 4 is in the cooling operation, the refrigerant discharged from the compressor 411 simultaneously passes sequentially through the usage side heat exchanger 42, the heat source side heat exchanger 44, and the usage side heat exchanger 42, so as to simultaneously perform the hot water supply operation and the indoor cooling heating operation. Thus, the hot water supply operation may be continuously performed regardless of switching between heating and cooling, as the water at the usage side circulates through the hot water supply heat exchanger 462 and the usage side heat exchanger 42.

In the embodiment show in FIG. 8, the hot water supply operation and the heating/cooling operation can be simultaneously performed. In more detail, the refrigerant discharged from the compressor 411 passes sequentially through the usage side heat exchanger 42, the air-conditioning heat exchanger 491, the expander 413, and the heat source side heat exchanger 44 so as to simultaneously perform the hot water supply operation and the heating operation. In addition, the refrigerant discharged from the compressor 411 passes sequentially through the usage side heat exchanger 42, the heat source side heat exchanger 44, the expander 413, and the air-conditioning heat exchanger 491 so as to simultaneously perform the hot water supply operation and the cooling operation.

In this embodiment, an operation state of the hot water supply apparatus 4 may be optimized based on the hot water supply load and the heating/cooling load. When the hot water supply operation and the heating/cooling operation are simultaneously performed, the amount of hot water supply side refrigerant flowing through the usage side heat exchanger 42 and the amount of heating/cooling side refrigerant bypassing the usage side heat exchanger 42 and flowing directly into the air-conditioning heat exchanger 491 or the heat source side heat exchanger 44 may be adjusted based on the hot water supply load and the heating/cooling load.

In more detail, when the hot water supply load is greater than the heating/cooling load, the amount of refrigerant passing through the usage side heat exchanger 42 increases, that is, the amount of heat transmitted to water of a hot water supply tank 461 through the hot water supply heat exchanger 462 increases, and a hot water supply target condition can be achieved more quickly. In addition, when the heating/cooling load is greater than the hot water supply load, the amount of refrigerant bypassing the usage side heat exchanger 42 increases, and thus, the amount of refrigerant discharged from the compressor 411 and introduced directly into the air-conditioning heat exchanger 491 increases in the heating operation. Thus, the amount of heat transmitted to the indoor space through the air-conditioning heat exchanger 491 increases to further improve heating performance. Thus, the operation state of the hot water supply apparatus 4 may be optimized based on the hot water supply load, that is, the particular operation conditions.

The hot water supply apparatus 4 associated with the heat pump in accordance with the embodiment shown in FIG. 8 may also include a water pipe 450, usage side pump 451, hot water supply pipe 452, heating/cooling water pipe 453, usage side three way valve 455, an auxiliary heater 463 and water discharge passage 464 provided in the hot water supply device 46, and a source water supply apparatus 48 including a water supply passage 481, circulation passage 482, circulation side pump 483, circulation side supply passage 484, water supply adjustment device 485, circulation side discharge passage 486, water discharge adjustment device 487 and hot water supply side supply passage 488. These components are similar to corresponding components discussed above with respect to previous embodiment(s), and thus further detailed description will be omitted.

A hot water supply apparatus 5 associated with a heat pump will be described in detail with reference to FIG. 9. This embodiment is different from the embodiment shown in FIGS. 1 and 4 in that a vapor refrigerant of refrigerants condensed in a refrigerant cycle may be injected into a compressor.

Figure 9:
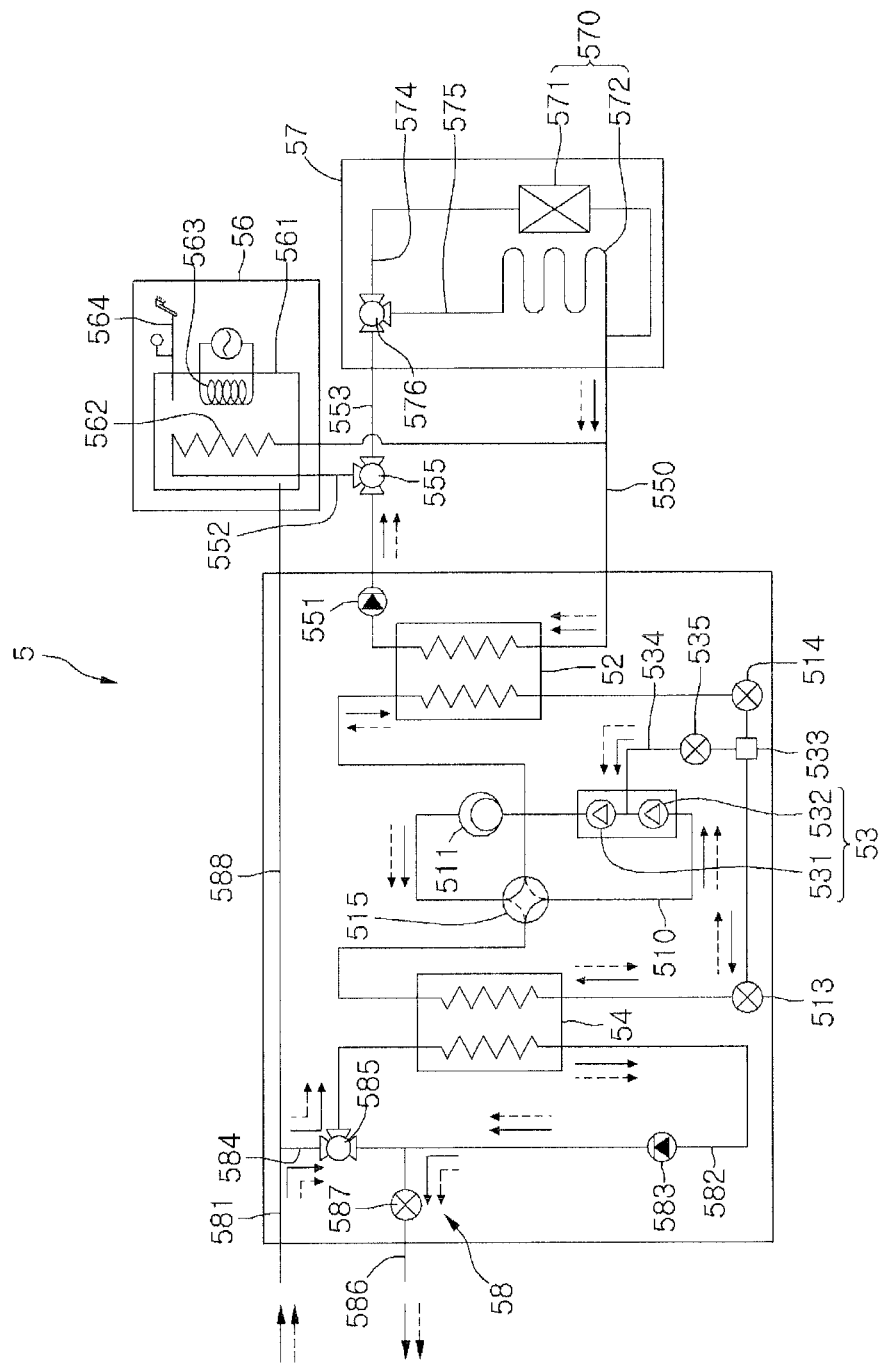
FIG. 9 is a schematic view of a hot water supply apparatus associated with a heat pump, according to another embodiment as broadly described herein.

In the embodiment shown in FIG. 9, a vapor refrigerant of refrigerants condensed in a refrigerant cycle may be injected into a compressor 53. The compressor 53 may be a multi-stage compressor 53 including a low stage compression part 532 primarily compressing refrigerant and a middle compression part 531 secondarily compressing the refrigerant compressed in the low stage compression part 532. A phase divider 533 may divide refrigerant condensed in a usage side heat exchanger 52 or a heat source side heat exchanger 54 of the refrigerant cycle into a vapor refrigerant and a liquid refrigerant, and an injection pipe 534 may inject the vapor refrigerant obtained at the phase divider 533 into the middle compression part 531 of the compressor 53. A first expander 513 and a second expander 514 may be disposed at both sides of the phase divider 533.

In a heating operation, the refrigerant flowing between the usage side heat exchanger 52 and the heat source side heat exchanger 54 may be injected into the compressor 53, thus increasing the amount of refrigerant flowing to the usage side heat exchanger 52 and improving hot water supply and heating performance. Although an evaporation heat amount of the refrigerant may decrease in the heat source side heat exchanger 54 and possibly degrade heating performance when the temperature of the heat source side water is relatively low, the refrigerant may be injected as described above to overcome this and improve the overall heating performance.

An injection valve 535 may selectively close the injection pipe 534 to selectively inject refrigerant into the compressor 53 based on outside temperatures. For example, when the heat source side water, that is, circulation water, has a temperature that is greater than or equal to a reference temperature, the injection valve 535 may be continually closed, and, when the heat source side water has a temperature that is less than the reference temperature, the injection valve 535 may be continually opened.

The hot water supply apparatus 5 associated with the heat pump in accordance with the embodiment shown in FIG. 9 may also include a refrigerant pipe 510, compressor 511, flow adjustment switch 515, water pipe 550, usage side pump 551, hot water supply pipe 552, heating/cooling water pipe 553, usage side three way valve 555, a hot water supply device 56 including a storage tank 561, hot water supply heat exchanger 562, auxiliary heater 563 and water discharge passage 564, a heating/cooling device 57 including an indoor heat exchanger 570 having an air conditioning heat exchanger 571 and a floor heat exchanger 572, an air conditioning water pipe 574 and a floor water pipe 575 and a heating/cooling side three way valve 576, and a source water supply apparatus 58 including a water supply passage 581, circulation passage 582, circulation side pump 583, circulation side supply passage 584, water supply adjustment device 585, circulation side discharge passage 586, water discharge adjustment device 587 and hot water supply side supply passage 588. These components are similar to corresponding components discussed above with respect to previous embodiment(s), and thus further detailed description will be omitted.

A hot water supply apparatus 6 associated with a heat pump will be described in detail with reference to FIG. 10. This embodiment is different from the embodiment shown in FIGS. 1 and 4 in that a hot water supply device associated with a heat pump is a multi-system device including a plurality of hot water supply devices and a plurality of heating/cooling devices.

Figure 10:
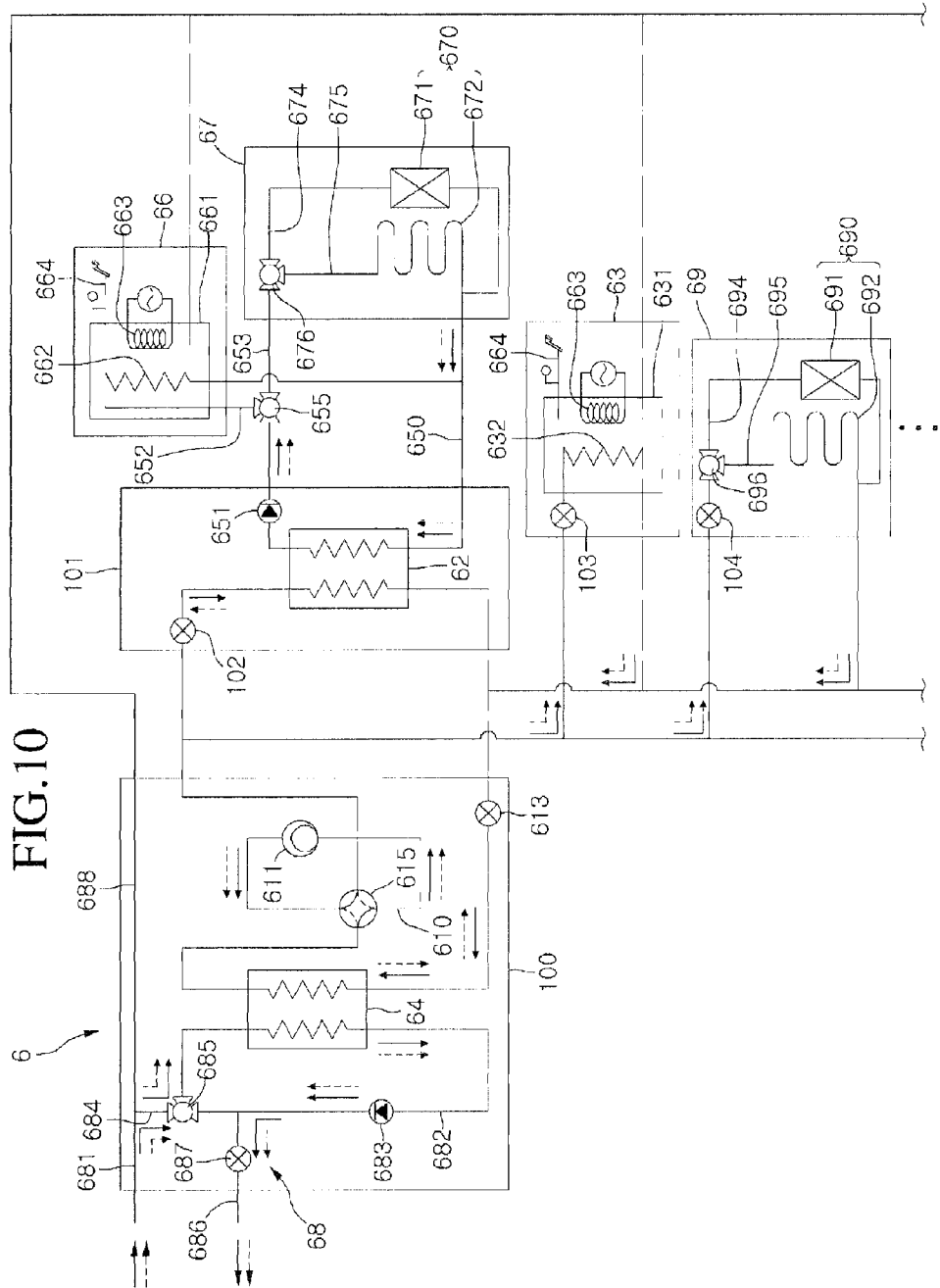
FIG. 10 is a schematic view of a hot water supply apparatus associated with a heat pump, according to another embodiment as broadly described herein.

Referring to FIG. 10, the hot water supply apparatus 6 associated with a heat pump is configured as a multi-system device including a plurality of hot water supply devices 63 and 66 and a plurality of heating/cooling devices 67 and 69. A single heat pump 100 may be used to perform a hot water supply operation of the hot water supply devices 63 and 66 and a heating/cooling operation of the heating/cooling devices 67 and 69.

The hot water supply apparatus 6 may include the heat pump 100 in which heat source side water is heat-exchanged with refrigerant, a relay 101 in which usage side water is heat-exchanged with the refrigerant from the heat pump 100, a first hot water supply device 66 using water discharged from the relay 101 to perform a hot water supply operation, a first heating/cooling device 67 using water discharged from the relay 101 to heat and cool an indoor space, a second hot water supply device 63 using the refrigerant discharged from the heat pump 100 to perform a hot water supply operation, and a second heating/cooling device 69 using the refrigerant discharged from the heat pump 100 to heat and cool the indoor space.

The heat pump 100 and the relay 101 may be connected to a refrigerant pipe 610, and the first hot water supply device 66 and the first heating/cooling device 67 may be connected through a water pipe 650 to the relay 101. That is, the first hot water supply device 66 and the first heating/cooling device 67 may be indirectly connected to the heat pump 100 through the relay 101. The second hot water supply device 63 and the second heating/cooling device 69 may be directly connected to the heat pump 100 through the refrigerant pipe 610. The relay 101, the second hot water supply device 63, and the second heating/cooling device 69 may be connected to the heat pump 100 in parallel. That is, the refrigerant discharged from the heat pump 100 may be distributed to the relay 101, the second hot water supply device 63, and the second heating/cooling device 69.

The usage side water is heat-exchanged with water of a hot water supply tank 661 in a hot water supply heat exchanger 662 of the first hot water supply device 66, and the refrigerant is heat-exchanged with water of a hot water supply tank 631 in a hot water supply heat exchanger 632 of the second hot water supply device 63. Thus, the first hot water supply device 66 and the first heating/cooling device 67 indirectly receive, through the usage side water, heat from the refrigerant heated by the heat source side water, and the second hot water supply device 63 and the second heating/cooling device 69 directly receive heat from the refrigerant heated by the heat source side water.

A hot water supply side supply passage 688 is connected to the hot water supply tank 661 of the first hot water supply device 66 and the hot water supply tank 631 of the second hot water supply device 63, so that water can be continually supplied to the hot water supply tanks 631 and 661 of the first and second hot water supply devices 66 and 63.

The refrigerant pipe 610 connected to the relay 101, the second hot water supply device 63, and the second heating/cooling device 69 may be provided with flow rate adjustment devices 102, 103, and 104 corresponding respectively to the relay 101, the second hot water supply device 63, and the second heating/cooling device 69, so that the amount of refrigerant introduced to the relay 101, the second hot water supply device 63, and the second heating/cooling device 69 may be adjusted. The amount of refrigerant introduced to the relay 101, the second hot water supply device 63, and the second heating/cooling device 69 may be adjusted based on, for example, hot water supply loads and heating/cooling loads of the first hot water supply device 66, the first heating/cooling device 67, the second hot water supply device 63, and the second heating/cooling device 69.

In this embodiment, the single heat pump 100 may be used to perform a hot water supply operation and a heating/cooling operation in a plurality of places. For example, the first hot water supply device 66 and the first heating/cooling device 67 may be installed at a first location, and the second hot water supply device 63 and the second heating/cooling device 69 may be installed at a second location, so that a hot water supply operation and a heating/cooling operation may be simultaneously and/or selectively performed at the first and second locations.

The hot water supply apparatus 6 associated with the heat pump in accordance with the embodiment shown in FIG. 10 may also include a heat source side heat exchanger 64, a compressor 611, flow adjustment switch 615, water pipe 650, usage side pump 651, hot water supply pipe 652, heating/cooling water pipe 653, usage side three way valve 655, an auxiliary heater 663 and water discharge passage 664 provided in the hot water supply devices 63 and 66, indoor heat exchangers 670/690 having air conditioning heat exchangers 671/691 and floor heat exchangers 672/692, air conditioning water pipes 674/694, floor water pipes 675/695 and heating/cooling side three way valves 676/696 provided in heating/cooling devices 67 and 69, and a source water supply apparatus 68 including a water supply passage 681, circulation passage 682, circulation side pump 683, circulation side supply passage 684, water supply adjustment device 685, circulation side discharge passage 686, water discharge adjustment device 687 and hot water supply side supply passage 688. These components are similar to corresponding components discussed above with respect to previous embodiment(s), and thus further detailed description will be omitted.

A hot water supply device associated with a heat pump is provided which may minimize degradation due to an outdoor condition variation and continuously perform a hot water supply operation and a heating operation without a defrosting operation. A hot water supply device associated with a heat pump and using the heat pump to perform a hot water supply operation as embodied and broadly described herein may include a compressor compressing a refrigerant; a condenser in which the refrigerant discharged from the compressor is condensed; an expander in which the refrigerant passing through the condenser is expanded; an evaporator in which the refrigerant passing through the expander is evaporated; and wherein refrigerants of the condenser and the evaporator are heat-exchanged with water to continuously perform the hot water supply operation without a defrosting operation. In a hot water supply device as embodied and broadly described herein, degradation due to the variation in an outdoor condition such as outdoor temperature may be minimized and defrosting operation may be unnecessary, and the hot water supply operation and the heating operation may be continuously performed.

Any reference in this specification to "one embodiment," "an embodiment," "example embodiment," etc., means that a particular feature, structure, or characteristic described in connection with the embodiment is included in at least one embodiment as broadly described herein. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A hot water supply apparatus provided with a heat pump so as to perform a hot water supply operation, comprising:
   a main refrigerant circuit including a compressor to compress refrigerant, an expander, and a first water-refrigerant heat exchanger in which heat is exchanged between the refrigerant and water supplied from a water supply source;
   a heating part including an air-conditioning heat exchanger through which water circulates;
   a hot water supply part including a hot water supply tank to store water supplied from the water supply source and a hot water supply heat exchanger in which heat is exchanged between the water in the hot water supply tank and the water circulated in the heating part;
   a second water-refrigerant heat exchanger in which heat is exchanged between the refrigerant and the water circulated in the heating part;
   a first three-way valve to switch a flow direction of the circulation water passing through the second water-refrigerant heat exchanger to the hot water supply heat exchanger or the heating part;
   a water supply passage to receive water from the water supply source;
   a hot water supply side passage to connect the water supply passage to the hot water supply part to supply water from the water supply source to the hot water supply part;
   a circulation passage in which water to be heat-exchanged with the refrigerant in the first water-refrigerant heat exchanger circulates;
   a circulation side supply passage to connect to the water supply passage and to extend to the circulation passage so as to supply the water in the water supply passage to the circulation passage;
   a second three-way valve installed on the circulation side supply passage to selectively prevent a water supply through the circulation side supply passage;
   a four way valve to switch a flow direction of a refrigerant discharged from the compressor to one of the first and the second water-refrigerant heat exchanger;
   a first conduit to connect the first water-refrigerant heat exchanger with the four way valve; and
   a second conduit to connect the second water-refrigerant heat exchanger with the four way valve.

2. The hot water supply apparatus of claim 1, further comprising a pump installed on the circulation passage to forcibly move the water through the circulation passage.

3. The hot water supply apparatus of claim 2, wherein the apparatus is configured to forcibly circulate water through the circulation passage when a temperature of the water circulating through the circulation passage is less than or equal to a freezing and bursting reference temperature, and to resume a previous operation state when the temperature of the water circulating through the circulation passage is greater than the freezing and bursting reference temperature, wherein the previous operation state is an operation state prior to the forcible circulation of water through the circulation passage.

4. The hot water supply apparatus of claim 2, further comprising:
   a circulation side discharge passage that discharges water from the circulation passage; and
   a discharge valve that selectively controls the discharge of water from the circulation side discharge passage, wherein the second three-way valve and the discharge valve prevents water supply to and discharge from the circulation passage when a temperature of the water in the circulation passage is greater than a circulation reference temperature, and wherein the second three-way valve and the discharge valve supply water to and discharge water from the circulation passage when the temperature of the water in the circulation passage is less than or equal to the circulation reference temperature.

5. The hot water supply apparatus of claim 1, wherein refrigerant flowing through the condenser is cooled by water that has undergone heat-exchange with the refrigerant in the evaporator, wherein the hot water supply apparatus further comprises:
- a subcooler in which water discharged from the evaporator undergoes heat-exchange with refrigerant discharged from the condenser to subcool and condense the refrigerant discharged from the condenser; and
- a circulation passage connecting the evaporator to the subcooler such that water circulates through the evaporator and the subcooler.

6. The hot water supply apparatus of claim 1, wherein the hot water supply apparatus further comprises:
- an auxiliary heater that selectively heats water received in the hot water supply tank; and
- a hot water discharge passage that supplies hot water from the hot water supply tank, wherein the water received in the hot water supply tank to be heated and the water that has undergone heat-exchange with refrigerant in the evaporator are supplied from the same water supply source.

7. The hot water supply apparatus of claim 1, further comprising a heater that uses refrigerant discharged from the compressor to perform a heating operation, wherein the heater comprises a heating heat exchanger in which refrigerant flows to heat a designated space.

\* \* \* \* \*